United States Patent [19]
Moore et al.

[11] Patent Number: 5,979,936
[45] Date of Patent: Nov. 9, 1999

[54] AIRBAG INFLATOR

[75] Inventors: Walter A. Moore, Ogden; Karl K. Rink, Liberty, both of Utah

[73] Assignee: Autoliv ASP, Inc., Ogden, Utah

[21] Appl. No.: 08/997,124

[22] Filed: Dec. 23, 1997

[51] Int. Cl.$^6$ .................................................. B60R 21/26
[52] U.S. Cl. ......................... 280/736; 280/737; 280/741
[58] Field of Search .................................... 280/741, 736, 280/737

[56] References Cited

U.S. PATENT DOCUMENTS

| | | |
|---|---|---|
| 2,816,419 | 12/1957 | Mueller . |
| 5,330,730 | 7/1994 | Brede et al. . |
| 5,344,186 | 9/1994 | Bergerson et al. . |
| 5,470,104 | 11/1995 | Smith et al. . |
| 5,494,312 | 2/1996 | Rink . |
| 5,496,062 | 3/1996 | Rink et al. . |
| 5,531,473 | 7/1996 | Rink et al. . |
| 5,544,785 | 8/1996 | Frigiere . |
| 5,649,720 | 7/1997 | Rink et al. ............................ 280/741 |
| 5,669,629 | 9/1997 | Rink . |
| 5,713,595 | 2/1998 | Mooney et al. . |

*Primary Examiner*—Eric Culbreth
*Attorney, Agent, or Firm*—Sally J. Brown

[57] ABSTRACT

An inflator apparatus and method for inflating an inflatable device wherein a solid fuel material and nitrous oxide are stored in intimate contact and, when properly actuated, react to produce inflation gas for use in inflating the inflatable device.

25 Claims, 2 Drawing Sheets

AIRBAG INFLATOR

BACKGROUND OF THE INVENTION

This invention relates generally to inflatable restraint systems and, more particularly, to an apparatus and method for inflating an inflatable device such as an inflatable vehicle occupant restraint airbag cushion, such as commonly used in such systems.

It is well known to protect a vehicle occupant using a cushion or bag, e.g., an "airbag," that is inflated or expanded with gas when the vehicle encounters sudden deceleration, such as in a collision. In such systems, the airbag cushion is normally housed in an uninflated and folded condition to minimize space requirements. Upon actuation of the system, the cushion begins being inflated in a matter of no more than a few milliseconds with gas produced or supplied by a device commonly referred to as "inflator."

Many types of inflator devices have been disclosed in the art for inflating an inflatable restraint systems airbag cushion. Prior art inflator devices include compressed stored gas inflators, pyrotechnic inflators and hybrid inflators. Unfortunately, each of these types of inflator devices has been subject to certain disadvantages such as greater than desired weight and space requirements, production of undesired or non-preferred combustion products in greater than desired amounts, and production or emission of gases at a greater than desired temperature, for example.

In view of these and other related or similar problems and shortcomings of prior inflator devices, a new type an inflator, called a "fluid fueled inflator," has been developed. Such inflators are the subject of commonly assigned Smith et al., U.S. Pat. No. 5,470,104, issued Nov. 28, 1995; Rink, U.S. Pat. No. 5,494,312, issued Feb. 27, 1996; and Rink et al., U.S. Pat. No. 5,531,473, issued Jul. 2, 1996, the disclosures of which are fully incorporated herein by reference.

Such an inflator device utilizes a fuel material in the form of a fluid, e.g., in the form of a gas, liquid, finely divided solid, or one or more combinations thereof, in the formation of an inflation gas for an associated inflatable device. In one such inflator device, the fluid fuel material is burned to produce gas which contacts a quantity of stored pressurized gas to produce inflation gas for use in inflating a respective inflatable device.

While such fluid fueled inflators avoid or minimize at least some of the above-identified shortcomings of prior inflator devices, the proper storage of a fuel material together with a corresponding oxidant can be difficult, especially over prolonged periods of time such as are commonly or typically associated with inflatable restraint systems in automotive vehicles, which systems require a responsive lifetime which extends for a period of years. Also, while the separate storage of the fuel and oxidant can alleviate or reduce some such storage concerns, the complexity and cost of the design and manufacture of an inflator providing such separate storage of fuel and oxidant can be greater than desired.

In view thereof, there remains a need for an inflator device which satisfies one or more of the following objectives: increased simplicity of design and construction; avoidance or minimization of the risks or problems associated with the storing, handling and dispensing of various and selected gas generant materials; and permits even further reductions in assembly weight and cost.

SUMMARY OF THE INVENTION

A general object of the invention is to provide an improved apparatus and method for inflating an inflatable device.

A more specific objective of the invention is to overcome one or more of the problems described above.

The general object of the invention can be attained, at least in part, through an apparatus for inflating an inflatable device, which apparatus includes a first chamber having contents including quantities of nitrous oxide and fuel material in the form of a solid stored in contact with each other. The apparatus also includes an initiator to initiate reaction of at least a portion of the quantity of nitrous oxide with at least a portion of the quantity of fuel material to form combustion products including at least one gaseous combustion product.

The prior art generally fails to provide as simple as desired design and construction for an inflator wherein a fuel material and separately provided oxidant are burned to produce or form inflation gas for use in inflating an associated inflatable restraint. As a result, one or more of the weight, cost and size of such prior art inflator devices can be greater than may be desired.

The invention linther comprehends an apparatus for inflating an inflatable device, which apparatus includes a normally closed first chamber having pressurized contents including quantities of nitrous oxide and a combustible fuel material in the form of an open cell foam. At least a portion of the nitrous oxide is stored in the first chamber in a liquid phase in contact with the combustible open cell foam fuel material. The apparatus also includes an initiator to initiate reaction of at least a portion of the quantity of nitrous oxide with at least a portion of the quantity of the combustible fuel material to form combustion products including at least one gaseous combustion product.

The invention flirther comprehends a method for inflating an inflatable safety device. Such a method includes the steps of:

burning a solid form of fuel material stored in contact with nitrous oxide oxidant to form combustion products including at least one gaseous combustion product and releasing inflation gas comprising at least a portion of the at least one gaseous combustion product from the apparatus to inflate the inflatable safety device.

Other objects and advantages will be apparent to those skilled in the art from the following detailed description taken in conjunction with the appended claims and drawings.

DETAILED DESCRIPTION OF THE INVENTION

Figure 1:
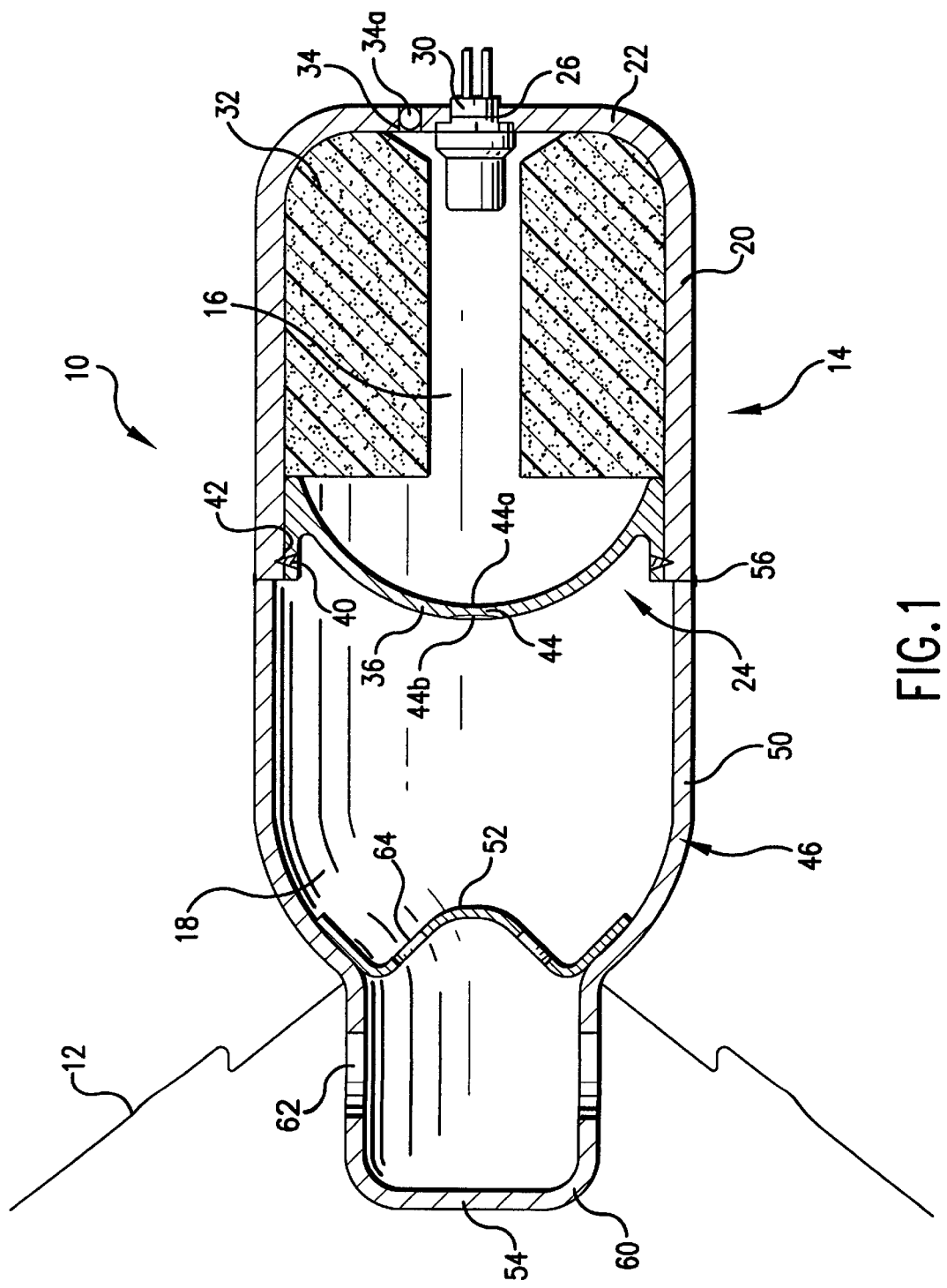
FIG. 1 is simplified, partially in section, schematic drawing of a vehicle occupant safety apparatus in accordance with one embodiment of the invention.

The present invention may be embodied in a variety of different structures. As representative, FIG. 1 illustrates the present invention as embodied in a vehicle occupant safety apparatus, generally designated by the reference numeral 10. The vehicle occupant safety apparatus 10 includes an inflatable vehicle occupant restraint 12, e.g., an inflatable airbag cushion, and in accordance with one embodiment of the invention an apparatus generally designated by the reference numeral 14 and commonly referred to as an inflator for use in inflating the occupant restraint.

Upon proper actuation of the vehicle safety apparatus 10, the vehicle occupant restraint 12 is inflated by a flow of an inflation fluid, e.g., a gas, from the inflator 14 to restrain movement of an occupant of the vehicle. The inflatable vehicle occupant restraint 12 is typically designed to be inflated into a location within the vehicle between the occupant and certain parts of the vehicle interior, such as the doors, steering wheel, instrument panel or the like, to reduce the possibility and severity of the occupant forcibly striking such parts of the vehicle interior.

It will be understood that the invention described hereinafter has general applicability to various types or kinds of airbag assemblies including driver side, passenger side, and side impact airbag assemblies for various kinds or types of vehicles such as automotive vehicles including, for example, vans, pick-up trucks, and particularly automobiles.

The inflator 14 includes first and second chambers 16 and 18, respectively. The first chamber 16, as described in greater detail below, contains a solid form of a fuel material in contact with nitrous oxide and is sometimes referred to herein as a "combustion" or "reaction" chamber. The second chamber 18, as will be described in greater detail below, serves to help quench the reaction products passed thereinto from the reaction chamber 16 and is sometimes referred to herein as a "quenching" chamber.

The reaction chamber 16 is defined in part by a cup-shaped base 20 having a base end 22 and an opposite open end 24. The base end 22 includes an opening 26 wherethrough an initiator device 30 is attached in sealing relation with the reaction chamber 16 such as by means (not shown) of laser welding, an O-ring, crimping or other suitable hermetic seal.

In general, the initiator device 30 can be of any suitable type of initiator means including: bridgewire, spark-discharge, heated or exploding wire or foil, through bulkhead (e.g., an initiator which discharges through a bulkhead such as in the form of a metal hermetic seal), for example, and may, if desired, optionally contain a desired load of a pyrotechnic charge. In practice, a relatively large heat input such as from the initiator, of may be helpfiul in obtaining a more thorough initiation of the desired reaction of the fuel and stored nitrous oxide. In view thereof, as pyrotechnic charge-containing initiators can typically more easily produce such relatively large heat inputs from a relatively small sized initiator device, the practice of the invention with such initiators can be particularly advantageous.

The solid fuel in the illustrated embodiment is in the form of a foam and designated by the reference numeral 32, is preferably compressed to maximize space utilization and installed in the base 20. Such as to facilitate assembly design, manufacture and operation, in a preferred embodiment of the invention, the solid fuel foam 32 is held in place within the base 20 through friction. It will be appreciated, however, that alternative or supplemental forms of attachment, such as realized through the use of an adhesive or bonding, for example, can also or alternatively be used to secure such or a similar solid fuel with or to the base 20, if desired.

The base 20 includes a fill port 34, as is known in the art, wherethrough a selected reaction chamber fill material including, for example, nitrous oxide either alone or in combination with one or more inert gases, can be passed into the reaction chamber 16 and placed in contact, e.g., in direct, physical contact, with the solid fuel 32. In describing the subject invention, such direct physical contact of nitrous oxide and solid fuel is sometimes referred to as "intimate contact."

It will be appreciated that the fill material, e.g., nitrous oxide either alone or in combination with one or more inert gases, passed or fed into the reaction chamber can, for example, be in the form of a gas, liquid or a combination of gas and liquid. In one preferred embodiment of the invention, the fill material used to fill the solid fuel-containing reaction chamber consists essentially of nitrous oxide. In such an embodiment, the storage pressure within the reaction chamber can typically be in the range of about 600 psi to about 1500 psi and preferably in the range of about 650 psi to about 700 psi at normal ambient temperature.

Under such conditions, some and preferably a significant portion of the quantity of stored nitrous oxide can advantageously be stored in a liquid phase. As a result of the increase in density associated with storage in a liquid phase, as opposed to storage in a gas phase, liquid phase storage can result in reducing or minimizing the needed or required storage volume and thus result in an inflator having a more compact structure or design.

Further, such storage pressures are generally substantially lower than the storage pressures normally or typically utilized in hybrid and fluid fueled inflators, such as identified above. Thus, the corresponding inflator can be designed in view of such lower pressures and need not include the relatively thick and heavy walls normally associated with storage at those higher pressures. As a result, an inflator design of lighter weight and typically lower cost can be realized.

It will be appreciated that particular preferred embodiments of the invention may also include one or more inert gases such as may also be stored in contact with the solid fuel 32. The inclusion of a relatively small amount of a given inert gas constituent, such as helium, for example, can be desirable for use in the detection of the possibility of a leak from a pressurized vessel, as is commonly known in the art. In addition or alternatively, an inert gas such as argon, for example, can if needed or desired be included in the reaction chamber 16 to effectively reduce the rate of fuel combustion within the chamber 16, thereby serving to reduce the relative concentrations of fuel and oxidant within the reaction chamber. It will be appreciated that such included inert gas can thus serve essentially as a diluent.

After the reaction chamber 16 has been appropriately filled, the fill port 34 can be appropriately blocked or plugged, as is known, such as by a pin or ball 34*a*.

The open end 24 of the cup-shaped base 20 is closed by means of a chamber dome 36. In the illustrated embodiment, the chamber dome 36 is of one piece construction and is secured to the base 20 by means of a weld 40 at the inside surface 42 of the base 20. The chamber dome 36 includes an opening portion 44, designed to provide for fluid communication between the reaction chamber 16 and the quenching chamber 18. In the illustrated embodiment, the opening portion 44 is a cruciformed region in the chamber dome 36, designed to rupture or otherwise open when a predetermined pressure differential on the opposed surfaces 44*a* and 44*b* of the opening portion 44 is realized. With such opening, the reaction chamber 16 is placed in fluid communication with the quenching chamber 18.

In practice, such a chamber dome assembly may be preferred as such an assembly can facilitate manufacture and assembly and provide improved reliability. It is to be understood, however, that other forms, means and techniques for providing for fluid communication from the reaction chamber 16 are also encompassed by the invention.

For example, the dome or wall separating the first chamber from the quenching chamber may simply include an opening normally covered by a burst disc designed to rupture at an appropriate predetermined pressure.

The inflator 14 also includes a second chamber assembly 46 which includes an outer wall 50 and a flow controller 52 which together serve to form the quenching chamber 18 and a diffuser portion 54. In the illustrated embodiment, the chamber assembly 46 is secured to the reaction chamber 16 such as by means of an inertial weld 56 of the second chamber assembly outer wall 50 to the reaction chamber base 20. It will be appreciated, however, that other forms and points of attachment or joinder can, if desired, be utilized.

The second chamber assembly outer wall 50 forms a diffuser 60 in one integral and continuous piece therewith. While such integral formation may provide various advantages such as simplifying assembly and manufacture, it is to be understood that other forms or types of diffusers can, if desired, be utilized in the practice of the invention. For example, a separately manufactured diffuser can be secured to an inflator assembly such as through the use of various attachment techniques such as through welding.

The diffuser 60 includes a plurality of exit ports 62 in the outer wall 50 for passage of inflation gas from the inflator 14 into the associated inflatable vehicle occupant restraint 12.

The flow controller 52 is secured to the diffuser portion 54 such as by press-fit insertion. The flow controller 52 includes a plurality of openings 64 wherethrough gas from the quenching chamber 18 is passed through to the diffuser 60 and directed to the associated inflatable vehicle occupant restraint 12. The flow controller 52 serves as a metering orifice which controls the flow rate of exiting gases and pressures within the quenching chamber 18.

As identified above, in the at rest state, the reaction chamber contains a solid form of a fuel material in contact with nitrous oxide. As will be appreciated, solid forms of fuel generally result in a greater fuel density and thus solid fuel forms can require smaller storage volumes and permit corresponding reductions in inflator size.

Many solid fuel materials are suitable for use in the practice of the invention including, for example, polyolefins, waxes and internally partially oxidized compounds such as polyesters, polyethers, acrylic polymers, phenols, polysaccharides (such as cellulose or starch), cellulose ethers, cellulose esters, nitrate salts of amines, nitramines, nitro-compounds and mixtures of two or more such listed materials. More specifically, suitable solid fuel materials for use in the practice of the invention are exemplified by ethyl cellulose, cellulose acetate, cellulose acetate butyrate, cellulose propionate, polyacetal, polyethylene, polypropylene, polystyrene, hydroxy-terminated polybutadiene, polymethylacrylate, naphthalene, and nitrocellulose, as well as combinations thereof.

In one preferred form of the invention, the solid fuel is in the form of a foam, preferably in the form of an open cell foam. For example, foams of various polyolefins such as polyesters, polyethers, polystyrene, polypropylene and polyethylene can, if desired, be used. For example, the use of a foam formed of a relatively long and straight polyolefin such as polyethylene foam having a density in the range of about 20–40 kg/m$^3$ and a cell size in the range of about 1–3 mm can be particularly advantageous.

In addition, catalysts and burn rate modifiers such as boron hydrides and metal oxides such as copper oxide may, if desired, also be added or included.

Long chain polymers form another category of solid form fuel material useable in the invention. While various polymeric materials can be used in the practice of the invention, particularly useful polymer materials include:
1) thermoplastic materials such as polyethylene glycol and polyethylene, for example;
2) cellulosic materials such as cellulose acetate and cellulose acetate butyrate, for example; and
3) thermoset materials such as hydroxy-terminated polybutadiene, for example.

It will be appreciated that such solid material forms differ from the foam materials identified and described herein in that the surface porosity of such materials is minimized resulting in the combustion interface being substantially maintained at the external surface of the solid fuel. Thus, such solid polymeric forms can be shaped to provide either or both the reaction rate and mass flow rate of combustion products required or desired to provide desired inflation for a particular airbag cushion. For example, the shape of the solid can be tailored to provide an initially lower mass flow rate during the initial phase of deployment followed by a higher mass flow rate such as to properly inflate the airbag cushion after the cushion has achieved its proper deployment position. Thus, such solid fuel forms and corresponding airbag inflators, inflatable restraint systems and methods of operation can be utilized to avoid or minimize the potential of injury to a corresponding out-of-position vehicle occupant.

The use of an oxygen-including thermoplastic material such polyethylene glycol can be particularly advantageous. The additional oxygen included in the fuel material can be useful in improving the reaction rate so that proper combustion of the fuel material occurs within the short period of time provided for inflation of an airbag cushion. It will be appreciated that such a preferred type of fuel material can, if desired, be in the form of a monolithic solid grain or a quantity of extruded pellets. Further, such materials can typically be easily made via low-cost extrusion processing. Still further and if desired, additional oxidizer compounds such as potassium perchlorate, basic copper nitrate, etc., can be easily added during extrusion processing to enhance the reaction rate. Typically such additional oxidizer compounds, if added, are added in relatively low levels such that the final formulation is a mixture of fuel and oxidizer which remains fuel-rich and thus requires additional oxygen provided by the nitrous oxide to complete combustion.

In operation, such as upon the sensing of a collision, an electrical signal is sent to the initiator device 30. The initiator 30 provides a heat input into the reaction chamber 16 to initiate the combustion of the fuel housed within the reaction chamber 16.

The hot gas produced upon the burning of the fuel results in a rapid pressure rise within the reaction chamber 16. In addition, heat liberated during the combustion process can result in the vaporization of additional liquid-phase nitrous oxide and thereby result in additional nitrous oxide being available for combustion reaction with available fuel, as such reaction is believed to occur primarily in the gas phase. More specifically, vapor phase nitrous oxide such as may originally be present in the reaction chamber or formed therein through vaporization of stored liquid phase nitrous oxide, is believed to decompose or dissociate to form dissociation products including gaseous oxygen with which the solid fuel reacts, i.e., burns, to form combustion reaction products. Thus, nitrous oxide is believed at least in part to serve as an oxidant source used in the combustion of stored, solid fuel.

When the pressure within the reaction chamber 16 exceeds the structural capability of the opening portion 44, the opening portion 44 ruptures or otherwise permits the passage of hot combustion gas from the reaction chamber 16 into the quenching chamber 18.

In the quenching chamber 18, the hot combustion gas expelled from the reaction chamber 16 cools and passes through the flow controller 52 and, in turn, the diffluser 60 into the associated inflatable vehicle occupant restraint 12.

While in the above-described embodiment, stored nitrous oxide is utilized as an oxidant source used in the combustion of stored solid fuel, it will be appreciated that additional quantities or portions of the stored nitrous oxide can be utilized as a gas source material in the inflation of an associated airbag cushion. For example, as shown and disclosed in commonly assigned, Rink, U.S. Pat. No. 5,669,629, issued Sep. 23, 1997, the disclosure of which is hereby fully incorporated by reference herein and made a part hereof, such nitrous oxide can serve as a gas source material which undergoes decomposition to form or produce decomposition products used to inflate an inflatable device.

Figure 2:
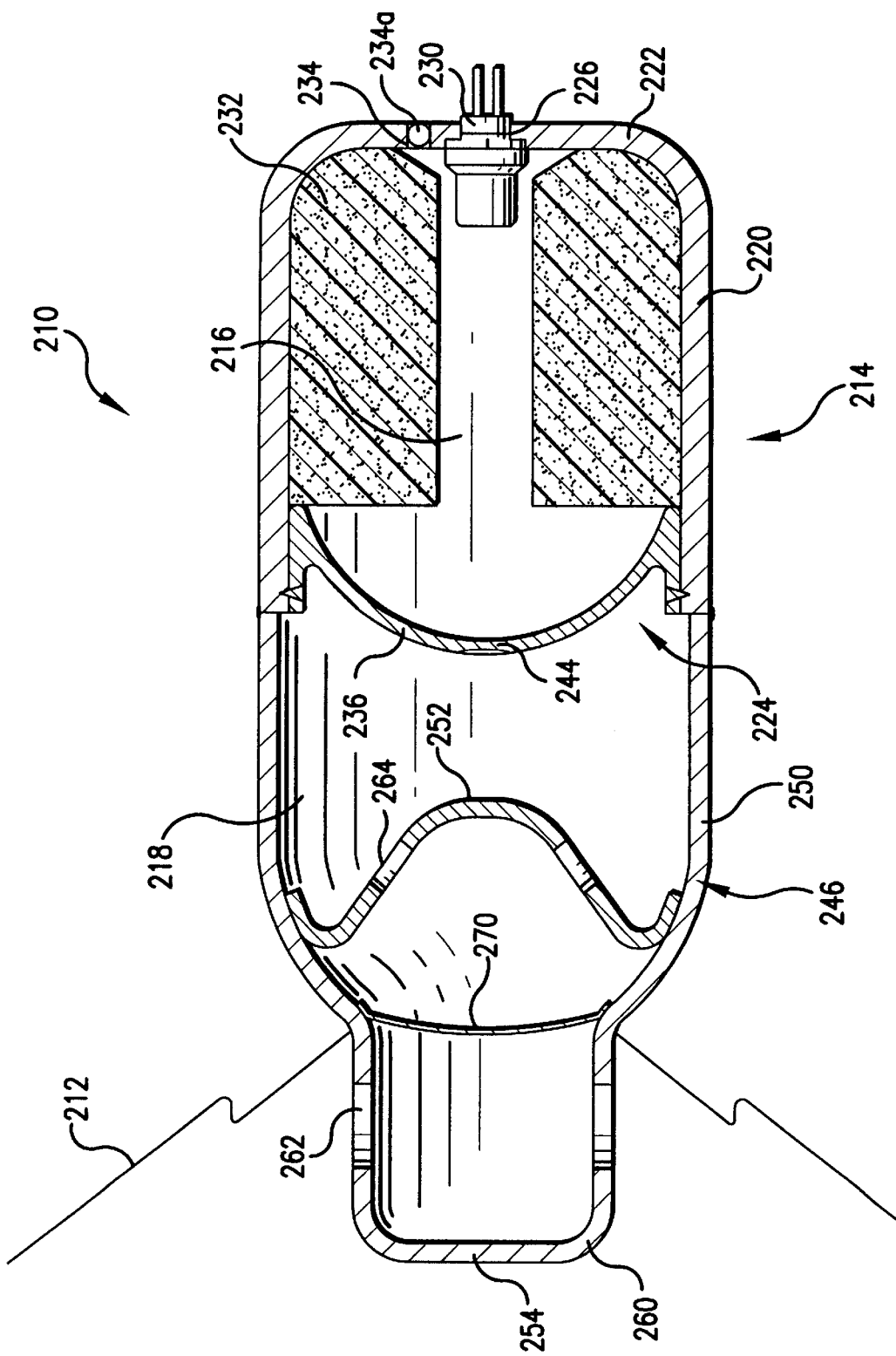
FIG. 2 is simplified, partially in section, schematic drawing of a vehicle occupant safety apparatus in accordance with an alternative embodiment of the invention.

FIG. 2 illustrates a vehicle occupant safety apparatus, generally designated by the reference numeral 210, in accordance with an alternative embodiment of the invention. The vehicle safety apparatus 210 is generally similar to the vehicle safety apparatus 10, described above, and includes an inflatable vehicle occupant restraint 212, e.g., an inflatable airbag cushion, and an inflation apparatus, generally designated by the reference numeral 214, for inflating the occupant restraint 212.

The inflator 214 is generally similar to the inflator 14 described above and includes a first chamber 216 (also referred to as "combustion" or "reaction" chamber) and a second chamber 218 (also referred to as a "quenching" or "mixing" chamber). The reaction chamber 216 contains a solid form of a fuel material (designated by the reference numeral 232) in contact with nitrous oxide. The chamber 216, similar to the chamber 16 of the above-described embodiment, is defined in part by a cup-shaped base 220 having a base end 222 and an opposite open end 224. The base end 222 includes an opening 226 wherethrough an initiator device 230 is attached in sealing relation to the chamber 216. The base 220 includes a fill port 234 wherethrough materials such as the nitrous oxide, for example, can be passed into the reaction chamber 216. After the reaction chamber 216 has been filled, the fill port 234 can be appropriately blocked or plugged, as is known, such as by a pin or ball 234a.

The open end 224 of the cup-shaped base 220 is closed by means of a chamber dome 236 having an opening portion 244, designed to provide for fluid communication out from the reaction chamber 216 to the quenching chamber 220.

The inflator 214 also includes a second chamber assembly 246 which includes an outer wall 250 and a flow controller 252 which together serve to form the quenching chamber 218 and a diffuser portion 254.

The second chamber assembly outer wall 250 forms a diffuser 260 in one integral and continuous piece therewith. The diffuser 260 includes a plurality of exit ports 262 in the outer wall 250 for passage of inflation gas from the inflator 214 into the associated inflatable vehicle occupant restraint 212.

The flow controller 252 includes a plurality of openings 264 wherethrough gas from the quenching chamber 218 is passed through to the diffuser 260 and directed to the associated inflatable vehicle occupant restraint 212.

The inflator 214 differs from the inflator 14, however, in that the quenching chamber 218 is normally closed or sealed and is filled with an inert gas such as argon or nitrogen and pressurized to a pressure typically in the range of 2000–4000 psi. Such closure of the quenching chamber 218 is realized through the inclusion of a burst disc 270 or the like to normally separate the contents of the quenching chamber 218 from the diffuser 254.

Operation of the vehicle safety apparatus 210 is initially generally similar to operation of the apparatus 10 described above, such as upon the sensing of a collision, an electrical signal is sent to the initiator device 230. The initiator 230 provides a heat input to the reaction chamber 216 to initiate the combustion of the fuel and nitrous oxide housed therewithin.

The hot gas produced upon the burning of the fuel and nitrous oxide results in a rapid pressure rise within the reaction chamber 216. In addition, heat liberated during the combustion process can result in the vaporization of additional liquid-phase nitrous oxide and thereby result in additional nitrous oxide being available for combustion reaction with available fuel, as such reaction is believed to occur primarily in the gas phase.

When the pressure within the reaction chamber 216 exceeds the structural capability of the opening portion 244, the opening portion 244 ruptures or otherwise permits the passage of hot combustion gas into the quenching chamber 218.

In the quenching chamber 218, the hot combustion gas expelled from the reaction chamber 216 mixes with the pressurized gas stored within the quenching chamber 218 to produce inflation gas for use in inflating the inflatable vehicle occupant restraint 212.

It will be appreciated that augmenting the combustion gas with the stored inert gas produces an inflation gas having both a lower temperature and reduced byproduct concentration (e.g., $CO$, $NO_x$, $H_2O$, etc.) than the combustion gas alone.

When the gas pressure within the quenching chamber 218 exceeds the structural capability of the burst disc 270, the disc ruptures or otherwise permits the passage of the inflation gas through the diffuser 260 and out the diffuser exit ports 262 into the associated inflatable vehicle occupant restraint 212.

It is significantly noted that, in accordance with a preferred form of the invention, the rate of reaction between the solid fuel and the oxidant can be controlled, at least in apart, via the control or adjustment of parameters which are generally not applicable or utilizable in combustion systems which rely on the combustion of a fuel material in the form of a fluid such as a liquid or a gas in conjunction with an oxidant material. For example, the rate of reaction between an open cell foam form of fuel with an oxidant can be adjusted or controlled through adjusting and controlling the specific shape characteristics of the foam to yield pores or voids which have one or more of a selected diameter, length or outer shape, for example.

In the practice of the invention using solid forms of fuel materials, the rate at which the oxidant diffuses to the surface of the fuel solid is believed to be a primary phenomena controlling the rate of the combustion reaction. The amount and shape of the surface of the fuel solid will generally change as portions of the solid fuel are consumed. As a result, the relative amount of fuel material available to participate in the combustion reaction will also change over time. Thus, the combustion characteristics for a particular inflator design can advantageously be controlled or altered through adjustments made to the shape and properties of the solid fuel. For example, a solid grain form of fuel can be designed to provide a selected surface profile through reaction and thus provide a specific desired or tailored reaction rate of fuel or mass flow rate of inflation gas into an associated airbag cushion.

The inflator assemblies of the invention, such as described above, can provide or afford a number of advantages including, for example, utilizing reduced storage pressures and reducing one or more of inflator assembly weight, cost and size.

It is to be understood that the discussion of theory, such as the discussion that the combustion reaction between the fuel and the nitrous oxide occurs primarily in the gas phase, for example, is included to assist in the understanding of the subject invention and is in no way limniting to the invention in its broader applications.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An apparatus for inflating an inflatable device, said apparatus comprising:

a first chamber having contents including quantities of nitrous oxide and fuel material having a predetermined solid shape stored in contact with each other, and an initiator to initiate reaction of at least a portion of the quantity of nitrous oxide with at least a portion of the quantity of fuel material to form combustion products including at least one gaseous combustion product.

2. The apparatus of claim 1 wherein said first chamber is pressurized.

3. The apparatus of claim 1 wherein the contents of said first chamber are stored therein at a pressure in the range of about 600 psi to about 1500 psi.

4. The apparatus of claim 1 wherein the contents of said first chamber are stored therein at a pressure in the range of about 650 psi to about 700 psi.

5. The apparatus of claim 1 wherein the fuel material comprises an open cell foam.

6. The apparatus of claim 5 wherein the foam comprises a polyolefin.

7. The apparatus of claim 5 wherein at least a portion of the stored quantity of nitrous oxide is stored within pores in the foam.

8. The apparatus of claim 1 wherein the contents of said first chamber additionally includes a quantity of at least one inert gas.

9. The apparatus of claim 1 wherein at least a portion of the nitrous oxide stored in said first chamber is stored in a liquid phase.

10. The apparatus of claim 1 wherein said first chamber is normally closed, said apparatus additionally comprising a second chamber to which said first chamber is openable, said second chamber directing inflation gas into an associated inflatable device.

11. The apparatus of claim 10 wherein said second chamber is normally closed and contains a supply of pressurized stored gas, and wherein upon opening of said first chamber, at least a portion of the combustion products mixes with the pressurized stored gas to form inflation gas, the mixing of the combustion products with the pressurized stored gas increasing the temperature and pressure: within said second chamber, with said second chamber openable when a predetermined increase in pressure within said second chamber is realized whereby at least a portion of the inflation gas is expelled from said second chamber to inflate the device.

12. An apparatus for inflating an inflatable device, said apparatus comprising:

a normally closed first chamber having pressurized contents including quantities of nitrous oxide and a combustible fuel material in the form of an open cell foam, wherein at least a portion of the nitrous oxide is stored in said first chamber in a liquid phase in contact with the combustible open cell foam fuel material and an initiator to initiate reaction of at least a portion of the quantity of nitrous oxide with at least a portion of the quantity of the combustible fuel material to form combustion products including at least one gaseous combustion product.

13. The apparatus of claim 12 wherein the contents of said first chamber are stored therein at a pressure in the range of about 600 psi to about 1500 psi.

14. The apparatus of claim 12 wherein the contents of said first chamber are stored therein at a pressure in the range of about 650 psi to about 700 psi.

15. The apparatus of claim 12 wherein the foam comprises a polyolefin.

16. The apparatus of claim 12 wherein at least a portion of the stored quantity of nitrous oxide is stored within pores in the foam.

17. The apparatus of claim 12 wherein the contents of said first chamber additionally includes a quantity of at least one inert gas.

18. The apparatus of claim 12 additionally comprising a second chamber to which said first chamber is openable, said second chamber directing inflation gas into an associated inflatable device.

19. The apparatus of claim 18 wherein said second chamber is normally closed and contains a supply of pressurized stored gas, and wherein upon opening of said first chamber, at least a portion of the combustion products mixes with the pressurized stored gas to form inflation gas, the mixing of the combustion products with the pressurized stored gas increasing the temperature and pressure within said second chamber, with said second chamber openable when a predetermined increase in pressure within said second chamber is realized whereby at least a portion of the inflation gas is expelled from said second chamber to inflate the device.

20. A method for inflating an inflatable safety device, said method comprising the steps of:

burning a fuel material having a predetermined solid shape stored in a device in contact with nitrous oxide oxidant to form combustion products including at least one gaseous combustion product and releasing inflation gas comprising at least a portion of the at least one gaseous combustion product from the apparatus to inflate the inflatable safety device.

21. The method of claim 20 wherein at least initially said burning is conducted at a pressure greater than ambient pressure.

22. The method of claim 20 wherein the fuel material undergoing said burning comprises an open cell foam.

23. The method of claim 22 wherein the foam comprises a polyolefin.

24. The method of claim 20 wherein the fuel material and nitrous oxide are stored in a normally closed first chamber and the device additionally includes a second chamber to which the normally closed first chamber is openable, wherein said burning increases the temperature and pressure within the first chamber, said method additionally comprising the step of:

opening the first chamber when a predetermined increase in pressure within the first chamber is realized to expel combustion products therefrom into the second chamber.

25. The method of claim 24 wherein said second chamber is normally closed and contains a supply of pressurized stored gas, wherein upon opening of the first chamber, at least a portion of the combustion products mix with the pressurized stored gas to form inflation gas and increase the temperature and pressure within said second chamber, said method additionally comprising the step of:

opening the second chamber when a predetermined increase in pressure within the second chamber is realized whereby at least a portion of the inflation gas is expelled from the second chamber to inflate the device.

\* \* \* \* \*